United States Patent
Teshima et al.

(10) Patent No.: US 11,162,899 B2
(45) Date of Patent: Nov. 2, 2021

(54) WEAR AMOUNT MEASURING DEVICE AND WEAR AMOUNT MEASURING METHOD

(71) Applicant: JTEKT CORPORATION, Osaka (JP)

(72) Inventors: Toshiyuki Teshima, Nagoya (JP); Chie Toyoda, Nagakute (JP)

(73) Assignee: JTEKT CORPORATION, Osaka (JP)

( * ) Notice: Subject to any disclaimer, the term of this patent is extended or adjusted under 35 U.S.C. 154(b) by 1 day.

(21) Appl. No.: 16/819,708

(22) Filed: Mar. 16, 2020

(65) Prior Publication Data
US 2020/0300758 A1 Sep. 24, 2020

(30) Foreign Application Priority Data
Mar. 19, 2019 (JP) .............................. JP2019-050732

(51) Int. Cl.
*G01N 21/55* (2014.01)
*G01N 21/88* (2006.01)
*B23Q 17/24* (2006.01)

(52) U.S. Cl.
CPC ......... *G01N 21/55* (2013.01); *B23Q 17/2457* (2013.01); *G01N 21/8851* (2013.01)

(58) Field of Classification Search
CPC ............ B23Q 17/0909; B23Q 17/2457; G01N 21/55; G01N 21/8851; G01N 3/56; G01N 3/58; G05B 19/4065
See application file for complete search history.

(56) References Cited

U.S. PATENT DOCUMENTS

| | | | | |
|---|---|---|---|---|
| 4,831,365 A | * | 5/1989 | Thomas | G05B 19/4065 340/680 |
| 2015/0324963 A1 | * | 11/2015 | Sezginer | G06T 7/0008 382/144 |
| 2020/0211175 A1 | * | 7/2020 | Kunik | G06T 7/70 |
| 2021/0027440 A1 | * | 1/2021 | Sakuyama | G06T 3/40 |

FOREIGN PATENT DOCUMENTS

| JP | 8-257876 A | 10/1996 |
|---|---|---|
| JP | 11-351835 A | 12/1999 |

* cited by examiner

*Primary Examiner* — Hina F Ayub
(74) *Attorney, Agent, or Firm* — Oblon, McClelland, Maier & Neustadt, L.L.P.

(57) ABSTRACT

A wear amount measuring device includes: a light emitting unit configured to emit light on an object to be measured having a wear surface; an imaging unit configured to obtain an image of the object; and a calculation unit configured to calculate a wear amount by specifying a wear surface of the object from the obtained image. A positional relationship between the light emitting unit, the imaging unit, and the object is set such that, when a dummy object to be measured having a wear surface is arranged in place of the object, the light emitting unit and the imaging unit have a specular reflection relationship relative to the wear surface of the dummy object. The calculation unit calculates the wear amount by specifying the wear surface based on a difference in brightness of the image.

10 Claims, 5 Drawing Sheets

IMAGING UNDER SPECULAR REFLECTION ARRANGEMENT

FIG. 5B

IMAGING UNDER NON-SPECULAR REFLECTION ARRANGEMENT

ILLUMINATION OF LEFT SIDE ONLY

FIG. 7B

ILLUMINATION OF RIGHT SIDE ONLY

FIG. 7C

CUTTING EDGE RIDGE LINE    WEAR AMOUNT

ILLUMINATION FROM TWO SIDES

FRONT FLANK FACE

FIG. 7D

COAXIAL RING ILLUMINATION

FRONT FLANK FACE

FIG. 8

WEAR AMOUNT MEASURING DEVICE AND WEAR AMOUNT MEASURING METHOD

CROSS-REFERENCES TO RELATED APPLICATIONS

This application is based upon and claims the benefit of priority from Japanese Patent Application No. 2019-050732, filed on Mar. 19, 2019, the entire contents of which are incorporated herein by reference.

FIELD

The present disclosure relates to a wear amount measuring device or a wear amount measuring method for measuring a wear amount of a tool.

BACKGROUND

As a method for measuring a wear amount of a cutting edge of a grinding tool or the like, there is known a method of calculating the wear amount by taking an image of the cutting edge and analyzing its image data.

JP-A-H08-257876 discloses that a camera is arranged at a position facing a cutting edge, the cutting edge is illuminated by coaxial epi-illumination or small-sized ring light, and a wear amount of the cutting edge is measured from image data obtained by taking an image of the cutting edge in this state. JP-A-H08-257876 also discloses that the wear amount is measured by binarizing or multivaluing the image data to obtain a wear width of a flank face of the cutting edge.

JP-A-H11-351835 discloses a method of extracting a cutting edge contour line, which serves as a reference during measurement of a wear amount, from an image of a cutting edge of a tool. Specifically, the cutting edge contour line is extracted as follows. First, three or more extraction lines crossing a cutting edge direction are extracted from the image of the cutting edge of the tool. Next, line pixel data on the extraction lines is differentiated to obtain boundary candidate points between the tool cutting edge and background, and a combination of points on a mostly straight line is selected from combinations of the boundary candidate points to obtain a guide line of the cutting edge. Next, a differential image of the cutting edge of the tool is obtained. The differential direction is the cutting edge direction. Next, in a vicinity of the guide line, pixels in the differential image that have a large differential value are extracted and connected to extract the cutting edge contour line.

SUMMARY

However, in JP-A-H08-257876, a wear surface is darker than a normal surface and it is difficult to selectively detect the wear surface only. For this reason, it is not easy to automatically measure the wear amount by the method of JP-A-H08-257876.

In JP-A-H11-351835, when it is desired to automatically measure the wear amount, it is conceivable to detect the wear amount given a fact that a wear surface is slightly darker than a normal surface in the image of the tool cutting edge. However, a boundary between the wear surface and the normal surface is not clear and the cutting edge contour line serving as the reference for measuring the wear amount is not always found. For this reason, it is difficult to accurately detect the wear amount.

An object of the present disclosure is to provide a wear amount measuring device and a wear amount measuring method capable of accurately measuring a wear amount of a cutting edge of a tool.

In an aspect of the disclosure, there is provided a wear amount measuring device including: a light emitting unit configured to emit light on an object to be measured having a wear surface; an imaging unit configured to obtain an image of the object to be measured; and a calculation unit configured to calculate a wear amount by specifying the wear surface of the object to be measured from the image obtained by the imaging unit, wherein a positional relationship between the light emitting unit, the imaging unit, and the object to be measured is set such that, when a dummy object to be measured having a wear surface is arranged in place of the object to be measured, the light emitting unit and the imaging unit have a specular reflection relationship relative to the wear surface of the dummy object to be measured, and wherein the calculation unit calculates the wear amount by specifying the wear surface based on a difference in brightness of the image.

The wear amount measuring device may further include a view angle adjustment unit configured to perform control to reduce a view angle of the light emitting unit relative to the object to be measured and the dummy object to be measured. The positional relationship between the light emitting unit, the imaging unit, and the object to be measured is easily set as described above.

The wear amount measuring device may include a plurality of light emitting units including the light emitting unit. In wear amount measuring device, for each of the light emitting units, the positional relationship between the light emitting unit, the imaging unit, and the object to be measured may be set such that, when the dummy object to be measured having the wear surface is arranged in place of the object to be measured, the light emitting unit and the imaging unit have a specular reflection relationship relative to the wear surface of the dummy object to be measured. Further, angles of incidence of light from the plurality of light emitting units relative to the wear surface of the dummy object to be measured may be different from each other. Consequently, the wear surface can be accurately specified even when the wear surface has a plurality of angles.

In another aspect of the disclosure, there is provided a wear amount measuring method of calculating a wear amount by emitting light on an object to be measured having a wear surface, obtaining an image of the object to be measured, and specifying the wear surface of the object to be measured from the image obtained by imaging, the wear amount measuring method including: setting an emitting direction of light and an imaging direction have a specular reflection relationship relative to the wear surface of the dummy object to be measured; and calculating the wear amount by specifying the wear surface based on a difference in brightness of the image.

In the wear amount measuring method, the setting the emitting direction of light and the imaging direction to have the specular reflection relationship relative to the wear surface of the dummy object to be measured may include performing adjustment of the emitting direction of light and the imaging direction to allow the wear surface of the dummy object to be measured to be imaged brightly, the adjustment being repeated while a view angle of light to be emitted is gradually.

In the wear amount measuring method, light from a plurality of directions may be emitted on the object to be measured, and for each of the plurality of directions, the emitting direction of light and the imaging direction may be set to have the specular reflection relationship relative to the wear surface of the dummy object to be measured when the dummy object to be measured having the wear surface is arranged in place of the object to be measured. Further, angles of incidence of light from the plurality of directions relative to the wear surface of the dummy object to be measured may be different from each other. Consequently, the wear surface can be accurately specified even when the wear surface has a plurality of angles.

According to the present disclosure, it is possible to accurately specify a wear surface of an object to be measured and automatically measure a wear amount.

DETAILED DESCRIPTION

Hereinafter, specific embodiments of the present disclosure will be described with reference to the drawings, but the present disclosure is not limited to the embodiments.

First Embodiment

Figure 1:
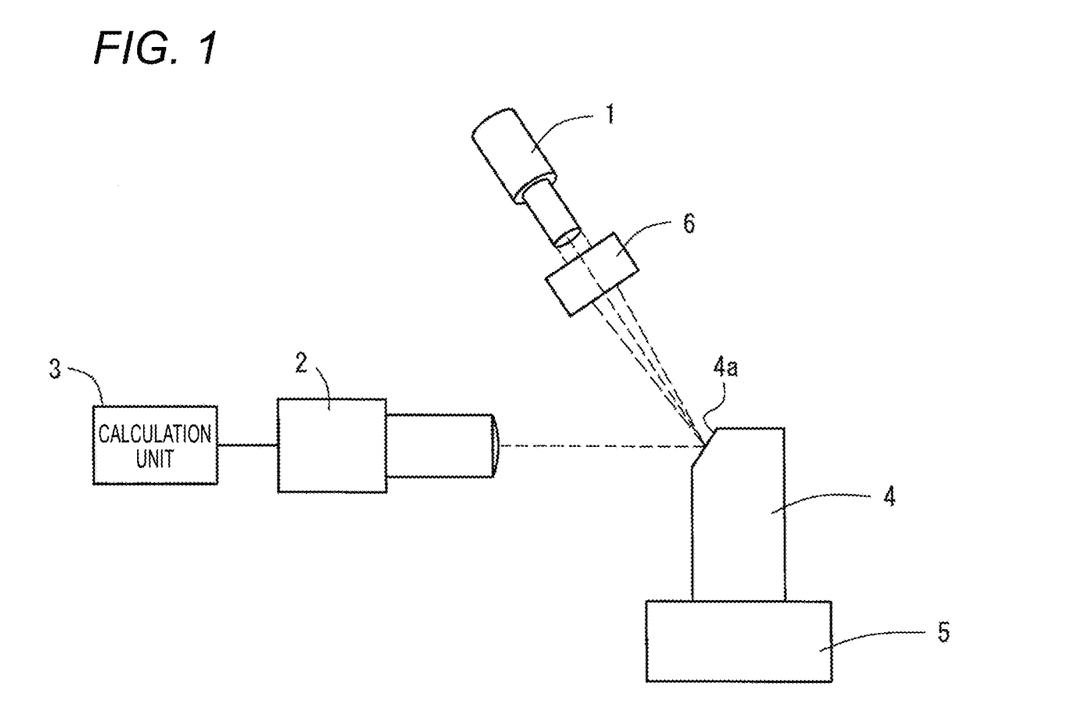
FIG. 1 shows a configuration of a wear amount measuring device according to a first embodiment.

FIG. 1 shows a configuration of a wear amount measuring device according to a first embodiment. The wear amount measuring device according to the first embodiment is a device that measures a wear amount of a cutting edge of the tool 4. As shown in FIG. 1, the wear amount measuring device according to the first embodiment includes the light source 1, the camera 2, and a calculation unit 3. The light source 1 corresponds to a light emitting unit of the present disclosure and the camera 2 corresponds to an imaging unit of the present disclosure. The tool 4, which is an object to be measured, is arranged on a stage 5 and is supported to be rotatable and linearly movable. A position and an orientation (angle) of the tool 4 are adjusted by the stage 5 so that light from the light source 1 is emitted on the cutting edge of the tool 4.

Figure 4:
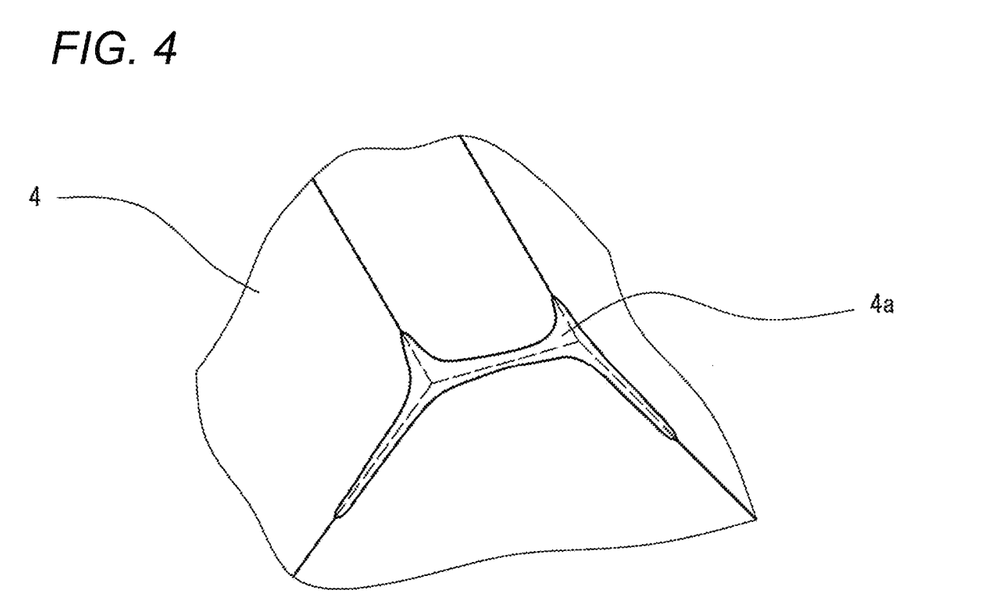
FIG. 4 shows an example of a worn tool 4.

FIG. 4 shows a state of the worn cutting edge of the tool 4. As shown in FIG. 4, a wear surface 4a is caused due to wear of the cutting edge. In FIG. 4, a dotted line indicates a cutting edge ridge line before wear. The wear surface 4a has an angle different from those of other surfaces constituting the cutting edge such as a flank face and a cutting face. In the wear amount measuring device according to the first embodiment, the wear amount is calculated by specifying a range of the wear surface 4a by image processing. Wear described in the present specification includes not only wear of the cutting edge of the tool 4 but also wear caused by chipping, deformation, and the like, which means a state of a shape different from that of an original shape.

Figure 8:
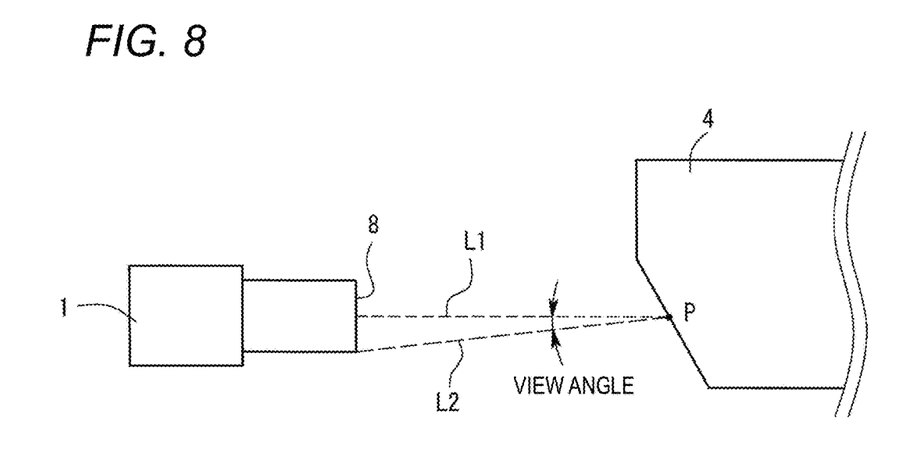
FIG. 8 shows a definition of a view angle.

The light source 1 is a device that emits light on the cutting edge of the tool 4. The wavelength of light of the light source 1 is arbitrary as long as it can be reflected by the tool 4 and imaged by the camera 2. Light whose light emitting surface 8 has an appropriate size is used as the light of the light source 1. For example, a light source having a view angle of 5° or more and 15° or less is used as the light source 1. As long as the view angle is within this range, the wear amount of the tool 4 can be measured relatively accurately. Here, as shown in FIG. 8, the view angle of the light source 1 relative to the tool 4 is defined as an angle between L1 and L2, in which L1 is a center axis of the light emitting surface 8 of the light source 1, P is an intersection of L1 and the tool 4, and L2 is a straight line connecting an end portion of the light emitting surface 8 and the point P. The view angle of the light source 1 relative to the dummy tool 7 to be described later is defined in the same manner.

The view angle adjustment unit 6 is provided near a light emitting side of the light source 1. The view angle adjustment unit 6 is a device that performs control to reduce the view angle of light emitted from the light source 1 relative to the tool 4 and the dummy tool 7. The view angle adjustment unit 6 is used to adjust a positional relationship between the light source 1, the camera 2, and the tool 4, which will be described later.

Figure 2:
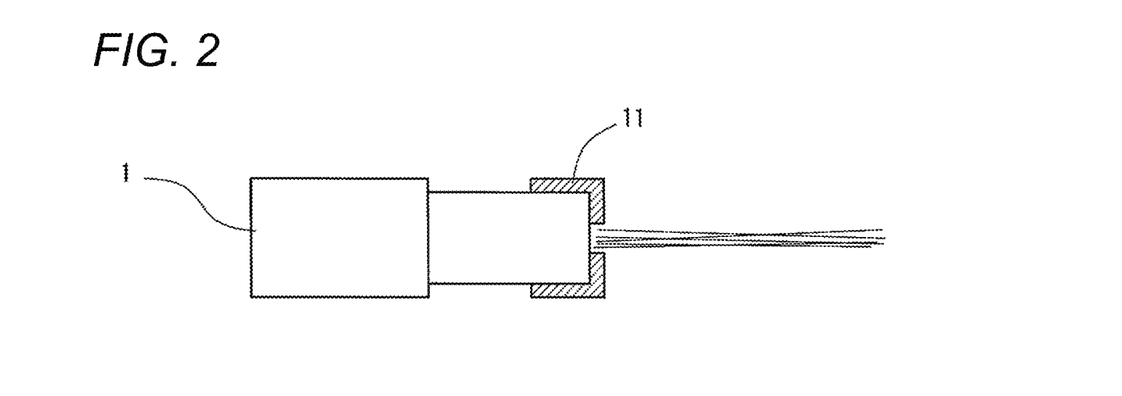
FIG. 2 shows a configuration of a view angle adjustment unit 6.

For example, as shown in FIG. 2, the view angle adjustment unit 6 is a device that adjusts the view angle by covering a protrusion of the light source 1 with a cylinder 11 whose opening has a diameter smaller than that of the light emitting surface. The view angle adjustment unit 6 may also be a diaphragm.

A minimum value of the view angle of the light source 1 may be 2° or less by the view angle adjustment unit 6. This makes it easy to adjust the positional relationship between the light source 1, the camera 2, and the tool 4 described later.

The camera 2 is a device that collects light reflected from the cutting edge of the tool 4 by a lens and then takes an image using an imaging sensor such as a CCD to acquire digital image data.

Figure 3:
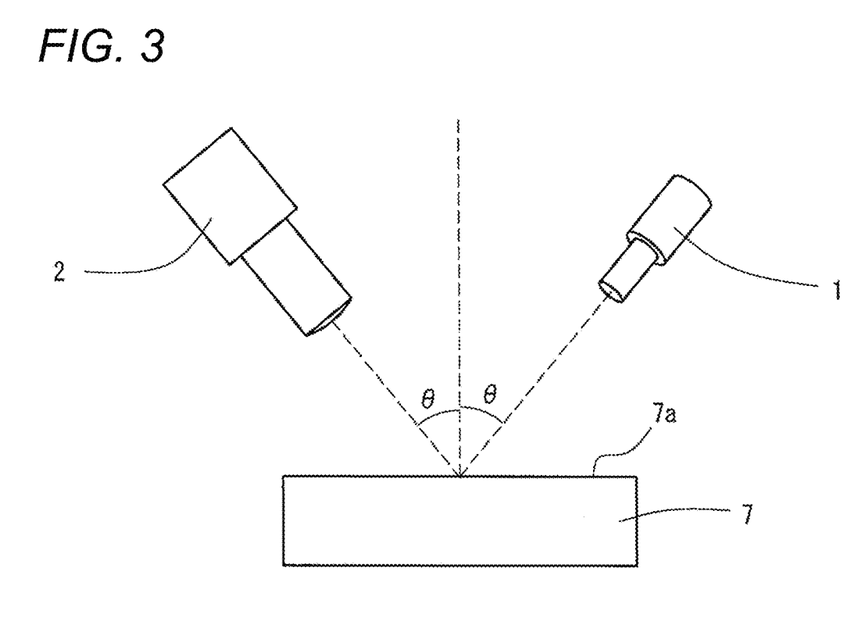
FIG. 3 shows an arrangement relationship between a light source 1, a camera 2, and a dummy tool 7.

The positional relationship between the light source 1, the camera 2, and the tool 4 is set such that the light source 1 and the camera 2 have a specular reflection relationship relative to a wear surface 7a of the dummy tool 7 when the dummy tool 7 is arranged in place of the tool 4 (see FIG. 3). That is, the light source 1 and the camera 2 are arranged such that an angle formed by an emitting direction of light from the light source 1 relative to the wear surface 7a is equal to an angle formed by an imaging direction of the camera 2 relative to the wear surface 7a. Here, the dummy tool 7 is a tool whose cutting edge is worn by a method such as actually using the same type of tool as the tool 4. A position, a range, and an angle of the wear surface 7a are known. The wear surface 7a, which is caused by wear of the cutting edge, has an angle different from those of other surfaces constituting the cutting edge (for example, a cutting face or a flank face).

The light source 1 and the camera 2 do not necessarily have a strict specular reflection relationship relative to the wear surface 7a of the dummy tool 7, and a slight deviation from the specular reflection relationship is allowed as long as the wear surface 4a of the tool 4 can be accurately specified. For example, 0.9<(θ2/θ1)<1.1 may be satisfied in which θ1 is the angle formed by the emitting direction of light from the light source 1 relative to the wear surface 7a and θ2 is an angle formed by a light receiving direction of the camera 2 relative to the wear surface 7a.

When there is an angle variation on the wear surface 7a of the dummy tool 7, the specular reflection relationship between the light source 1 and the camera 2 relative to the wear surface 7a of the dummy tool 7 is not uniquely determined. In such a case, the specular reflection relationship may be established in only a part of the wear surface 7a. Particularly, a region that satisfies specular reflection may be as wide as possible.

Since a positional relationship between the light source 1, the camera 2, and the dummy tool 7 is set as described above, the positional relationship between the light source 1, the camera 2, and the tool 4 is set such that the light source 1 and the camera 2 have a specular reflection relationship or near specular reflection relationship relative to the wear surface 4a of the tool 4. For example, the positional relationship between the light source 1, the camera 2, and the tool 4 is set such that light intensity from the wear surface 4a of the tool 4 is 90% or more relative to light intensity from the wear surface 7a when the light source 1 and the camera 2 have a specular reflection relationship relative to the wear surface 7a of the dummy tool 7.

The calculation unit 3 is connected to the camera 2 and digital image data of the cutting edge of the tool 4 imaged by the camera 2 is input to the calculation unit 3. The calculation unit 3 calculates the wear amount from the image data. The calculation unit 3 is implemented by, for example, an application program installed in a computer. The wear amount is defined, for example, as a maximum value of a width of a wear surface in a direction orthogonal to a cutting edge ridge line before wear. Alternatively, the wear amount may be defined as a reduced volume or mass due to wear.

Next, a method of calculating the wear amount of the cutting edge of the tool 4 using the wear amount measuring device according to the first embodiment will be described.

In preparation for measuring the wear amount of the tool 4, the dummy tool 7 is placed on the stage 5 in place of the tool 4 and the arrangement of the light source 1 is adjusted. First, a position and an orientation of the camera 2 are fixed, and a position and an orientation of the dummy tool 7 are adjusted by the stage 5 so that the cutting edge of the dummy tool 7 is located in the light receiving direction of the camera 2. The orientation of the camera 2 may be fixed such that a surface (for example, a cutting face) including a cutting edge ridge line is in parallel to the light receiving direction of the camera 2, so as to facilitate estimation of the cutting edge ridge line of the tool 4 in the subsequent step. Next, light from the light source 1 is emitted to the cutting edge of the dummy tool 7. The view angle of light of the light source 1 is maximized. That is, the view angle is in a state in which the view angle adjustment unit 6 does not adjust the view angle. Then, the cutting edge of the dummy tool 7 is imaged by the camera 2. Here, a position and an orientation of the light source 1 are roughly determined such that the wear surface 7a of the cutting edge of the dummy tool 7 is brighter than other surfaces constituting the cutting edge.

Next, the view angle adjustment unit 6 slightly reduces the view angle of light of the light source 1. Then, the cutting edge of the dummy tool 7 is imaged by the camera 2. The position and the orientation of the light source 1 are adjusted again so that the wear surface of the cutting edge of the dummy tool 7 is brighter than other surfaces.

The position and the orientation of the light source 1 are repeatedly adjusted while gradually reducing the view angle of light from the light source 1 by the view angle adjustment unit 6, and finally the position and the orientation of the light source 1 are adjusted to a state in which the view angle of the light source 1 is minimized by the view angle adjustment unit 6. Accordingly, an arrangement relationship between the light source 1 and the camera 2 relative to the wear surface 7a of the dummy tool 7 can be easily set a specular reflection relationship relative to the wear surface 7a of the dummy tool 7.

Although the position and the orientation of the camera 2 are fixed and only the position and the orientation of the light source 1 are adjusted in the first embodiment, the position and the angle of the light source 1 may be fixed and only the position and the angle of the camera 2 may be adjusted. The positions and the angles of both the light source 1 and the camera 2 may also be adjusted.

The arrangement relationship between the light source 1, the camera 2, and the dummy tool 7 is not necessarily adjusted using the view angle adjustment unit 6 as described above, and the arrangement relationship between the light source 1 and the camera 2 relative to the wear surface 7a of the dummy tool 7 may be adjusted by any method as long as the light source 1 and the camera 2 have a specular reflection relationship relative to the wear surface 7a of the dummy tool 7.

Next, the dummy tool 7 is removed from the stage 5 and the tool 4 for actually measuring the wear amount is arranged on the stage 5. At this time, the position and the orientation of the tool 4 are set in the same manner as those of the dummy tool 7. The positions and the orientations of the light source 1 and the camera 2 are not changed. Therefore, the light source 1 and the camera 2 have a specular reflection relationship or close specular reflection relationship relative to the wear surface 4a of the tool 4.

The view angle of the light source 1 is appropriately adjusted by the view angle adjustment unit 6. In general, the wear surface 4a of the tool 4 has a variation in angle, and the range of the wear surface 4a is calculated to be narrower than an actual range when the view angle of the light source 1 is minimized. As a result, the range of the wear surface 4a may not be sufficiently specified. In such a case, the range of the wear surface 4a can be sufficiently specified by appropriately adjusting the view angle of the light source 1 by the view angle adjustment unit 6. The maximum view angle (the view angle of the light source 1) may be used without controlling the view angle by the view angle adjustment unit 6.

Next, the cutting edge of the tool 4 is imaged by the camera 2 and its image data is subjected to image processing by the calculation unit 3 to calculate the wear surface 4a.

Here, since the positional relationship between the light source 1, the camera 2, and the dummy tool 7 is set such that the light source 1 and the camera 2 have a specular reflection relationship relative to the wear surface 7a of the dummy tool 7, the positional relationship between the light source 1, the camera 2, and the tool 4 is also set such that the light source 1 and the camera 2 have a specular reflection relationship or close specular reflection relationship relative to the wear surface 4a of the tool 4.

Therefore, most of light from the light source 1 is reflected by the wear surface 4a of the tool 4 and is emitted to the camera 2, and the wear surface 4a of the tool 4 is imaged brightly. On the other hand, light reflected by other surfaces (non-wear surfaces, for example, the cutting face or the flank face) constituting the cutting edge of the tool 4 is not emitted on the camera 2 and the other surfaces are imaged darkly. Therefore, the wear surface 4a of the tool 4 is imaged sufficiently brighter than the other surfaces.

Therefore, the wear surface 4a of the tool 4 can be identified by extracting a difference in brightness on the image data by easy image processing and the wear amount can be automatically measured.

For example, a boundary line of the wear surface 4a can be identified by extracting a boundary line of the difference in brightness by image processing such as differentiation, and accordingly the wear surface 4a can be identified. Then, the cutting edge ridge line before wear is estimated by straight line fitting and the wear amount can be calculated as a maximum value of the width of the wear surface 4a in the direction orthogonal to the cutting edge ridge line. It is also possible to measure a surface state of the wear surface 4a by measuring a luminance distribution or the like in the wear surface 4a.

When the view angle of the light source 1 is reduced by the view angle adjustment unit 6, the range of the wear surface 4a may be specified to be narrower than the actual range due to the angular variation of the wear surface 4a. Therefore, a change in the range of the wear surface 4a may be calculated by gradually increasing the view angle of the light source 1 by the view angle adjustment unit 6, and the wear surface 4a when the change in the wear surface 4a is constant may be specified as the actual range of the wear surface 4a of the tool 4.

According to the wear amount measuring device in the first embodiment as described above, the wear surface 4a caused by wear of the cutting edge of the tool 4 can be imaged to be brighter than other surfaces and be identified by easy image processing. Therefore, the wear amount of the tool 4 can be automatically measured with high accuracy.

Next, a result of imaging a wear part of the tool 4 using the wear amount measuring device according to the first embodiment will be described. The tool 4 and the dummy tool 7 were end mills.

Figure 5A:
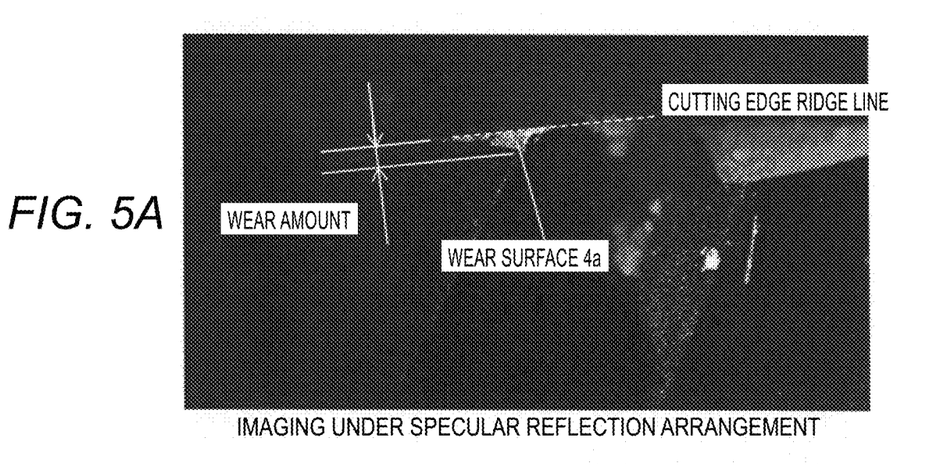
FIGS. 5A and 5B show photographs of a cutting edge of a worn end mill.
Figure 5B:
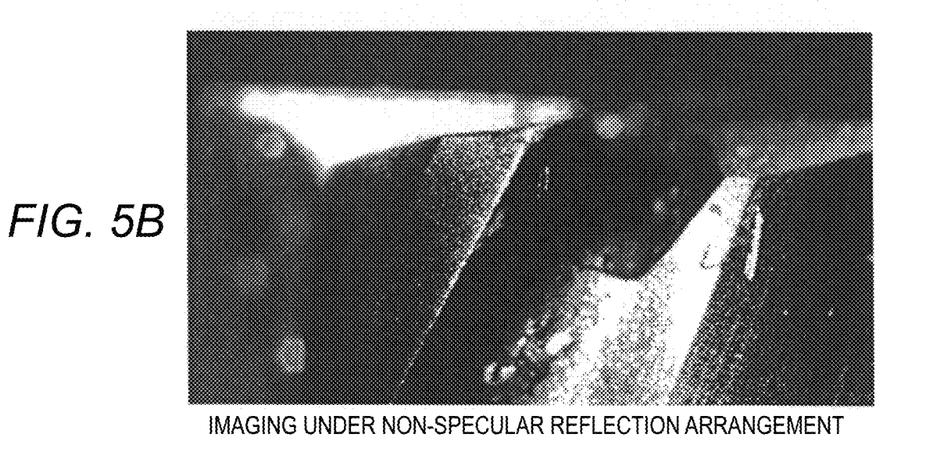

FIGS. 5A and 5B are photographs of the worn wear surface 4a of the tool 4. FIG. 5A shows a case where the wear surface 4a of the tool 4 is imaged using the wear amount measuring device according to the first embodiment in which the light source 1, the camera 2, and the dummy tool 7 have a specular reflection arrangement and FIG. 5B shows a case where the wear surface 4a of the tool 4 is imaged in which the light source 1, the camera 2, and the dummy tool 7 do not have a specular reflection arrangement.

As shown in FIG. 5A, since the light source 1 and the camera 2 have a positional relationship of specular reflection or close to specular reflection relative to the wear surface 4a of the tool 4, the wear surface 4a is imaged brighter than the other surfaces constituting the cutting edge. Therefore, the range of the wear surface 4a can be specified by easy image processing and automatic measurement of the wear amount can be implemented.

On the other hand, in FIG. 5B, since the light source 1 and the camera 2 do not have a specular reflection arrangement relative to the wear surface 4a of the tool 4, the other surfaces constituting the cutting edge are imaged brighter than the wear surface 4a and it is difficult to specify the wear surface 4a.

Second Embodiment

Figure 6:
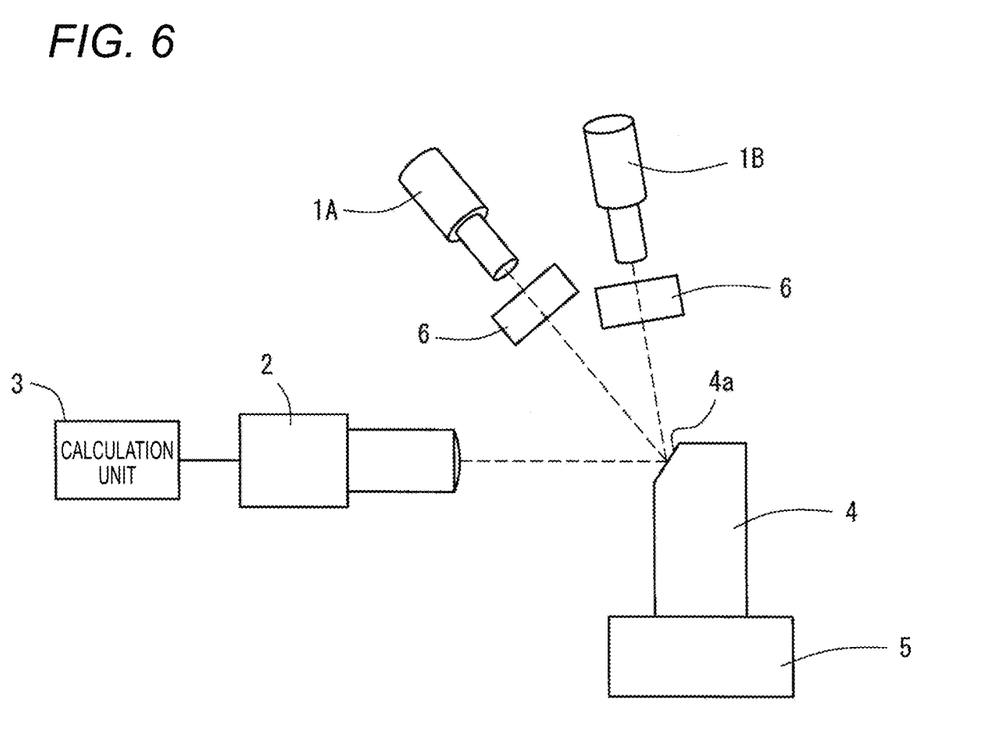
FIG. 6 shows a configuration of a wear amount measuring device according to a second embodiment.

FIG. 6 shows a configuration of a wear amount measuring device according to a second embodiment. As shown in FIG. 6, the wear amount measuring device according to the second embodiment includes two light sources 1 in the wear amount measuring device according to the first embodiment, and the view angle adjustment section 6 is provided near the light emitting side of each of the two light sources. Other configurations are the same as those of the wear amount measuring device according to the first embodiment. The two light sources 1 are hereinafter referred to as the light sources 1A, 1B.

Positional relationships between the light sources 1A, 1B, the camera 2, and the tool 4 are the same as that of the first embodiment for each of the light sources 1A, 1B. That is, the arrangement relationship between the light source 1A, the camera 2, and the tool 4 is set such that the light source 1A and the camera 2 have a specular reflection arrangement relative to the wear surface 7a of the dummy tool 7 when the dummy tool 7 is arranged in place of the tool 4. The arrangement relationship between the light source 1B, the camera 2, and the tool 4 is set such that the light source 1B and the camera 2 have a specular reflection arrangement relative to the wear surface 7a of the dummy tool 7 when the dummy tool 7 is arranged in place of the tool 4. Further, an angle of incidence of light from the light source 1A relative to the wear surface 7a of the dummy tool 7 is different from an angle of incidence of light from the light source 1B. Alternatively, incidence surfaces may be different from each other.

According to the wear amount measuring device according to the second embodiment, the wear surface 4a of the tool 4 can be identified by easy image processing and a wear amount of the tool 4 can be accurately measured with high accuracy, which is similar to the wear amount measuring device according to the first embodiment. Since the angle of incidence of light from the light source 1A relative to the wear surface 7a of the dummy tool 7 is different from the angle of incidence of light from the light source 1B, a range of the wear surface 4a can be accurately measured even when the wear surface 4a of the tool 4 includes a plurality of surfaces having different angles.

Although the number of the light sources 1 is two in the wear amount measuring device according to the second embodiment, three or more light sources may be used. In this case, angles of incidence of light from the light sources 1 relative to the wear surface 7a of the dummy tool 7 may be different from each other. However, it may be difficult to image the wear surface 4a of the tool 4 to be sufficiently brighter than other surfaces when the number of the light sources 1 is too large. Therefore, the number of the light sources 1 may be 3 or less.

Next, a result of imaging a wear part of the tool 4 using the wear amount measuring device according to the second embodiment will be described. The tool 4 and the dummy tool 7 were hob cutters.

Figure 7A:
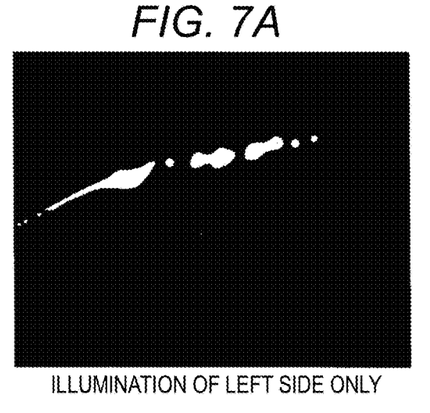
FIGS. 7A to 7D schematically show states in a vicinity of a wear surface when a cutting edge of a worn hob cutter is imaged.
Figure 7B:
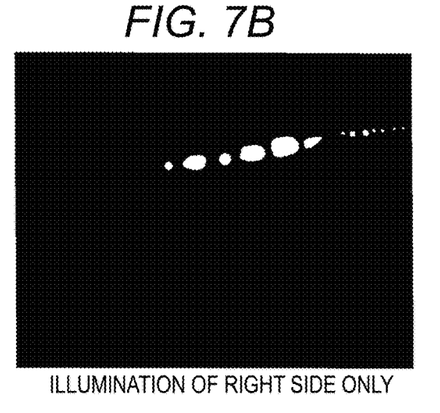
Figure 7C:
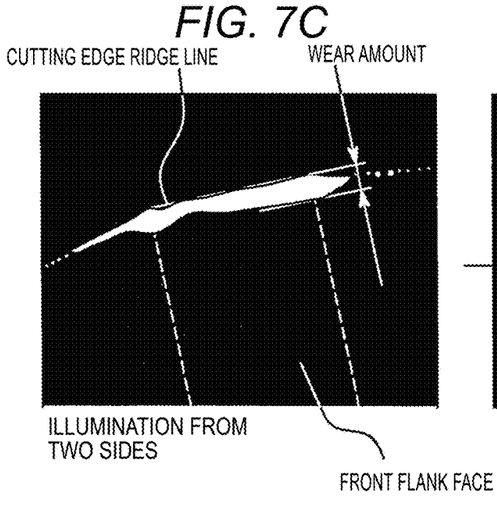
Figure 7D:
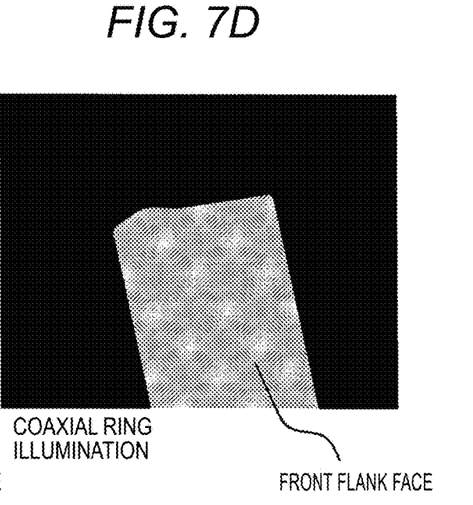

FIGS. 7A to 7D schematically show states in a vicinity of the wear surface 4a when the worn wear surface 4a of the tool 4 is imaged. FIG. 7A is a schematic view of a case where light is emitted from the light source 1 on a left side of the two light sources 1 and not emitted from the light source 1 on a right side to take an image using the wear amount measuring device according to the second embodiment. FIG. 7B is a schematic view of a case where light is emitted from the light source 1 on the right side and not emitted from the light source 1 on the left side to take an image, which is opposite to FIG. 7A. FIG. 7C is a schematic view of a case where light is emitted from both of the two light sources 1 to take an image. FIG. 7D is a schematic view of a case where light is emitted by coaxial ring illumination instead of two light sources 1.

As shown in FIG. 7A, when only light from the light source 1 on the left side is emitted, it is seen that a region on a left side of the wear surface 4a of the tool 4 is imaged brighter than other surfaces but a region on a right side of the wear surface 4a of the tool 4 is dark and the wear surface 4a cannot be accurately identified.

As shown in FIG. 7B, when only light from the light source 1 on the right side is emitted, it is seen that the region on the right side of the wear surface 4a of the tool 4 is imaged brighter than other surfaces but the region on the left side of the wear surface 4a of the tool 4 is dark and the wear surface 4a cannot be accurately identified.

As shown in FIG. 7C, when light is emitted from both the left and right light sources 1, the entire wear surface 4a is brightly imaged and other surfaces of the cutting edge are imaged darkly. Therefore, the entire wear surface 4a can be specified accurately by easy image processing and automatic measurement of the wear amount can be implemented.

As shown in FIG. 7D, when the coaxial ring illumination is used, the wear surface 4a of the tool 4 is imaged darkly and a front flank face is imaged brightly. Therefore, it is difficult to specify the wear surface 4a. This is because, when the coaxial ring illumination is used as a light source, the light source and the camera 2 do not have a specular reflection relationship relative to the wear surface 4a of the tool 4.

In the embodiments, the object to be measured is a tool and any tool may be used. The present disclosure can be used to measure a wear amount of a tool that performs, for example, turning processing, gear skiving processing, chamfering processing, and drilling processing. The present disclosure is not limited to measuring the wear amount of a tool and can measure the wear amount of any worn object. For example, the wear amount of a mold can be measured.

The wear amount measuring device of the present disclosure can be used to predict the wear amount of a tool, determine a replacement timing of a tool, and observe a surface state of a wear surface of a tool.

The invention claimed is:

1. A wear amount measuring device comprising:
a light emitting unit configured to emit light on an object to be measured having a wear surface;
an imaging unit configured to obtain an image of the object to be measured; and
a calculation unit configured to calculate a wear amount by specifying the wear surface of the object to be measured from the image obtained by the imaging unit,
wherein a positional relationship between the light emitting unit, the imaging unit, and the object to be measured is set using a dummy object to be measured having a wear surface arranged in place of the object to be measured, in which the light emitting unit and the imaging unit have a specular reflection relationship relative to the wear surface of the dummy object to be measured, and
wherein the calculation unit calculates the wear amount by specifying the wear surface based on a difference in brightness of the image.

2. The wear amount measuring device according to claim 1, further comprising:
a view angle adjustment unit configured to perform control to reduce a view angle of the light emitting unit relative to the object to be measured and the dummy object to be measured.

3. The wear amount measuring device according to claim 1, comprising:
a plurality of light emitting units comprising the light emitting unit,
wherein for each of the light emitting units, the positional relationship between the light emitting unit, the imaging unit, and the object to be measured is set using the dummy object to be measured having the wear surface is arranged in place of the object to be measured, in which the light emitting unit and the imaging unit have the specular reflection relationship relative to the wear surface of the dummy object to be measured, and
wherein angles of incidence of light from the plurality of light emitting units relative to the wear surface of the dummy object to be measured are different from each other.

4. The wear amount measuring device according to claim 1, wherein a position, a range, and an angle of the wear surface of the dummy object are known.

5. The wear amount measuring device according to claim 1, wherein the specular reflection relationship satisfies $0.9 < (\theta 2/\theta 1) < 1.1$ in which $\theta 1$ is an angle formed by an emitting direction of light from the light emitting unit relative to the wear surface of the dummy object and $\theta 2$ is an angle formed by a light receiving direction of the imaging unit relative to the wear surface of the dummy object.

6. A wear amount measuring method of calculating a wear amount by emitting light on an object to be measured having a wear surface using a light emitting unit, obtaining an image of the object to be measured using an imaging unit, and specifying the wear surface of the object to be measured from the image obtained by imaging, the wear amount measuring method comprising:
setting a positional relationship between the light emitting unit, the imaging unit, and the object to be measured using a dummy object to be measured having a wear surface arranged in place of the object to be measured, in which the light emitting unit and the imaging unit have a specular reflection relationship relative to the wear surface of the dummy object to be measured; and
calculating the wear amount of the object by specifying the wear surface based on a difference in brightness of the image.

7. The wear amount measuring method according to claim 6,
wherein said setting the positional relationship comprises performing adjustment of the light emitting unit and imaging unit to allow the wear surface of the dummy object to be measured to be imaged brightly, the adjustment being repeated while a view angle of light to be emitted is gradually reduced.

8. The wear amount measuring method according to claim 6,
wherein light from a plurality of light emitting units comprising the light emitting unit is emitted, and for each of the light emitting units, the positional relationship between the light emitting unit, the imaging unit, and the object to be measured is set using the dummy object to be measured having the wear surface arranged in place of the object to be measured, in which the light emitting unit and the imaging unit have the specular reflection relationship relative to the wear surface of the dummy object, and
wherein angles of incidence of light from the plurality of light emitting units relative to the wear surface of the dummy object to be measured are different from each other.

9. The wear amount measuring method according to claim 6, wherein a position, a range, and an angle of the wear surface of the dummy object are known.

10. The wear amount measuring method according to claim 6, wherein the specular reflection relationship satisfies $0.9 < (\theta 2/\theta 1) < 1.1$ in which $\theta 1$ is an angle formed by an emitting direction of light from the light emitting unit relative to the wear surface of the dummy object and θ2 is an angle formed by a light receiving direction of the imaging unit relative to the wear surface of the dummy object.

\* \* \* \* \*